US009826719B1

(12) United States Patent
Myrberg, III

(10) Patent No.: US 9,826,719 B1
(45) Date of Patent: Nov. 28, 2017

(54) PLANTER BIRD FEEDER COMBINATION WITH 360 DEGREE FEED PROTECTIVE SHIELD

(71) Applicant: Arthur A. Myrberg, III, Bakersville, NC (US)

(72) Inventor: Arthur A. Myrberg, III, Bakersville, NC (US)

(*) Notice: Subject to any disclaimer, the term of this patent is extended or adjusted under 35 U.S.C. 154(b) by 160 days.

(21) Appl. No.: 14/693,033

(22) Filed: Apr. 22, 2015

(51) Int. Cl.
A01K 39/00 (2006.01)
A01K 39/01 (2006.01)
A01K 39/014 (2006.01)
A01K 39/012 (2006.01)

(52) U.S. Cl.
CPC ........ *A01K 39/0113* (2013.01); *A01K 39/014* (2013.01); *A01K 39/0125* (2013.01)

(58) Field of Classification Search
CPC .. A01K 5/0114; A01K 5/0225; A01K 39/012; A01K 39/0113
USPC .............. 119/52.1, 52.2, 52.3, 57.8, 57.9, 59
See application file for complete search history.

(56) References Cited

U.S. PATENT DOCUMENTS

| D193,787 S | 10/1962 | Clever |
| 4,441,457 A | 4/1984 | Sanford |
| D334,636 S | 4/1993 | Honeycutt |
| D471,326 S | 3/2003 | Weiser et al. |
| 6,557,491 B1 | 5/2003 | Weiser et al. |
| 6,895,894 B2* | 5/2005 | Fort, II ................ A01K 39/012 119/51.01 |
| 7,028,636 B2 | 4/2006 | Weiser et al. |
| 8,201,519 B2* | 6/2012 | Humphries ........ A01K 39/0206 119/51.01 |
| 2007/0056519 A1 | 3/2007 | Palmer |
| 2010/0089330 A1* | 4/2010 | McMullen ......... A01K 39/0206 119/52.3 |
| 2010/0192866 A1* | 8/2010 | McMullen ........... A01K 39/014 119/77 |

* cited by examiner

*Primary Examiner* — Trinh Nguyen
(74) *Attorney, Agent, or Firm* — Richard L. Miller

(57) ABSTRACT

A hanging assemblage holding plants and feed for a bird and protecting the bird and the feed from a rodent. The hanging assemblage includes a feeder assembly, a planter assembly, and a protective assembly. The feeder assembly holds the feed for the bird. The planter assembly extends replaceably upwardly from the feeder assembly and holds the plants 12. The protective assembly is affixed around the planter assembly, is spaced over the feeder assembly, and protects the bird and the feed from the rodent.

36 Claims, 7 Drawing Sheets

PLANTER BIRD FEEDER COMBINATION WITH 360 DEGREE FEED PROTECTIVE SHIELD

BACKGROUND OF THE INVENTION

Field of the Invention

The present invention relates to a planter bird feeder, and more particularly, a planter bird feeder combination with 360 degree feed protective shield.

Description of the Prior Art

Numerous innovations for planters and bird feeders have been provided in the prior art that will be described. Even though these innovations may be suitable for the specific individual purposes to which they address, however, they differ from the present invention.

A FIRST EXAMPLE, U.S. Pat. No. 4,441,457, Issued on Apr. 10, 1984, to Sanford teaches a bird feeder stand adapted to support all types of feeders and planters having a water-filled base member supporting a vertically extending support post from the center thereof. The feeders are hung from cantilevered arms, while their bottoms are supported from lateral movement by adjustable brackets slidable on the support post.

A SECOND EXAMPLE, U.S. Pat. No. 6,557,491, Issued on May 6, 2003, to Weiser, et al. teaches a ferris wheel-like structure for feeding birds or acting as a planter, which may be supported in one of a myriad of positions.

A THIRD EXAMPLE, U.S. Pat. No. 7,028,636, Issued on Apr. 18, 2006, to Weiser, et al. teaches rotatable bird feeders. The bird feeders are composed of a generally planar surface having one or more containers positioned about the perimeter of the generally planar surface. In one embodiment, the containers have a first well coupled to a second well. The bird feeder also includes an axle having a first end and a second end where the first end of the axle is pivotally coupled to the generally planar surface, and the second end of the axle is coupled to an adapter. The adapter may be coupled to a post, a rod, or the like to mount the bird feeder in a desired location.

A FOURTH EXAMPLE, U.S. Pat. Office Document No. Des. 193,787, Issued on Oct. 9, 1962, to Clever teaches a combination bird feeder, planter, or the like.

A FIFTH EXAMPLE, U.S. Patent Office Document No. Des. 334,636, Issued on Apr. 6, 1993, to Honeycutt teaches the ornamental design for a combined domestic bird feeder and planter for window sill.

A SIXTH EXAMPLE, U.S. Patent Office Document No. Des. 471,326, Issued on Mar. 4, 2003, to Weiser, et al. teaches the ornamental design for a rotatable bird feeder-planter.

A SEVENTH EXAMPLE, U.S. Patent Office Document No. 2007/0056519, Published on Mar. 15, 2007, to Palmer teaches a hanging bird-feeder, bird-bath, and planter, which includes a lower container adapted to house a plant(s). An intermediate tray contains water and functions as a birdbath. An upper tray contains birdseed and functions as a feeder. A system of chains and hooks is employed to suspend the container and trays from a structural support, such as a post, tree limb or porch, ceiling, and the like. It is recommended that the suspension height is at least five feet to protect the birds from predators. In a second embodiment, a pair of ring members are utilized to support the bath and feed trays. The used water from the bath tray can be employed to water and fertilize the plant.

It is apparent now that numerous innovations for planters and bird feeders have been provided in the prior art that adequate for various purposes. Furthermore, even though these innovations may be suitable for the specific individual purposes to which they address, accordingly, they would not be suitable for the purposes of the present invention as heretofore described.

SUMMARY OF THE INVENTION

AN OBJECT of the present invention is to provide a planter bird feeder combination with 360 degree feed protective shield that avoids the disadvantages of the prior art.

ANOTHER OBJECT of the present invention is to provide a planter bird feeder combination with 360 degree feed protective shield that is simple and inexpensive to manufacture.

STILL ANOTHER OBJECT of the present invention is to provide a planter bird feeder combination with 360 degree feed protective shield that is simple to use.

BRIEFLY STATED, STILL YET ANOTHER OBJECT of the present invention is to provide a hanging assemblage holding plants and feed for a bird and protecting the bird and the feed from a rodent. The hanging assemblage includes a feeder assembly, a planter assembly, and a protective assembly. The feeder assembly holds the feed for the bird. The planter assembly extends replaceably upwardly from the feeder assembly and holds the plants 12. The protective assembly is affixed around the planter assembly, is spaced over the feeder assembly, and protects the bird and the feed from the rodent.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawings are briefly described as follows.

A MARSHALING OF REFERENCE NUMERALS UTILIZED IN THE DRAWING

Figure 1:
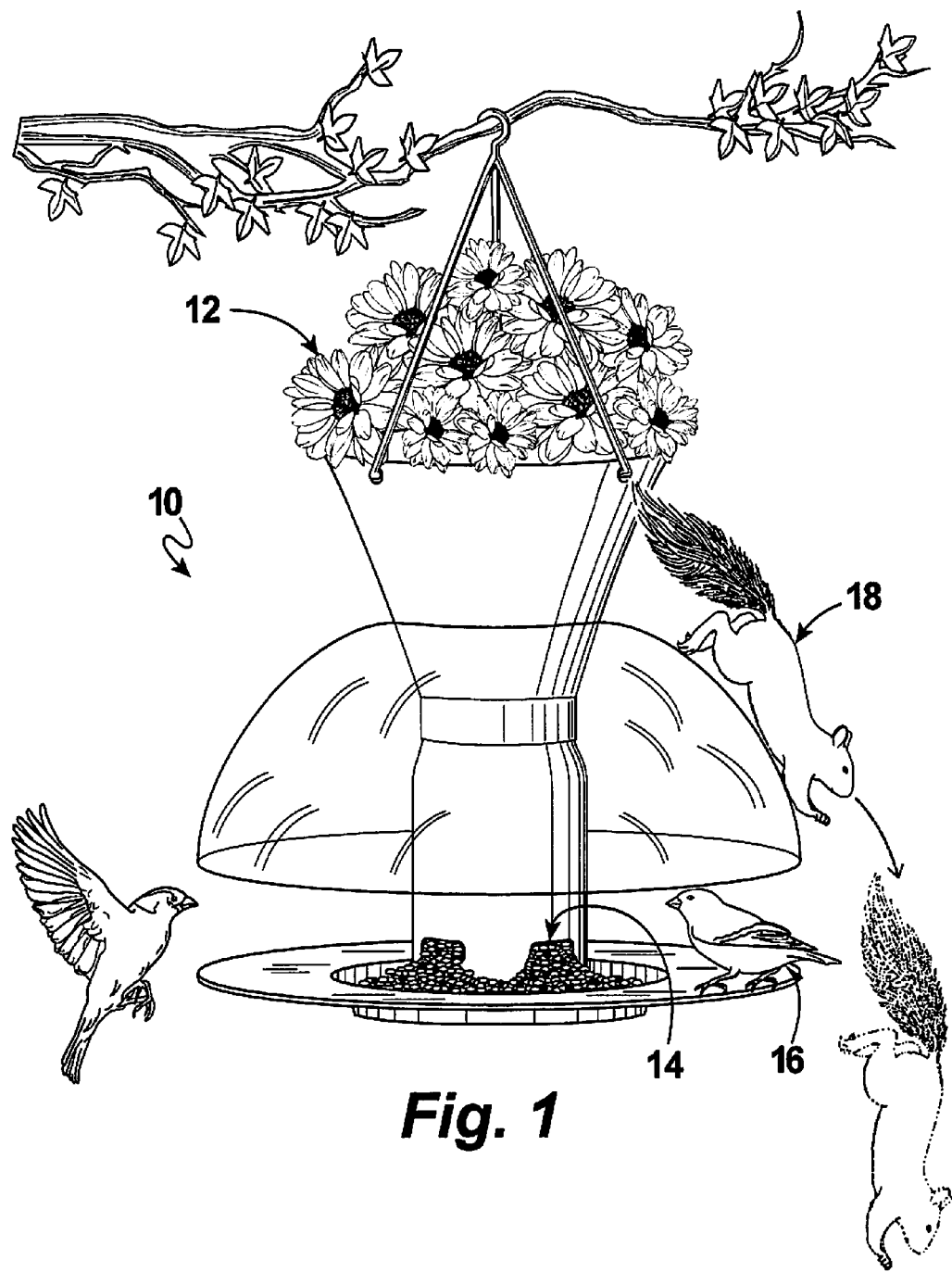
FIG. 1 is a diagrammatic perspective view of an embodiment of the present invention in use.
Figure 2:
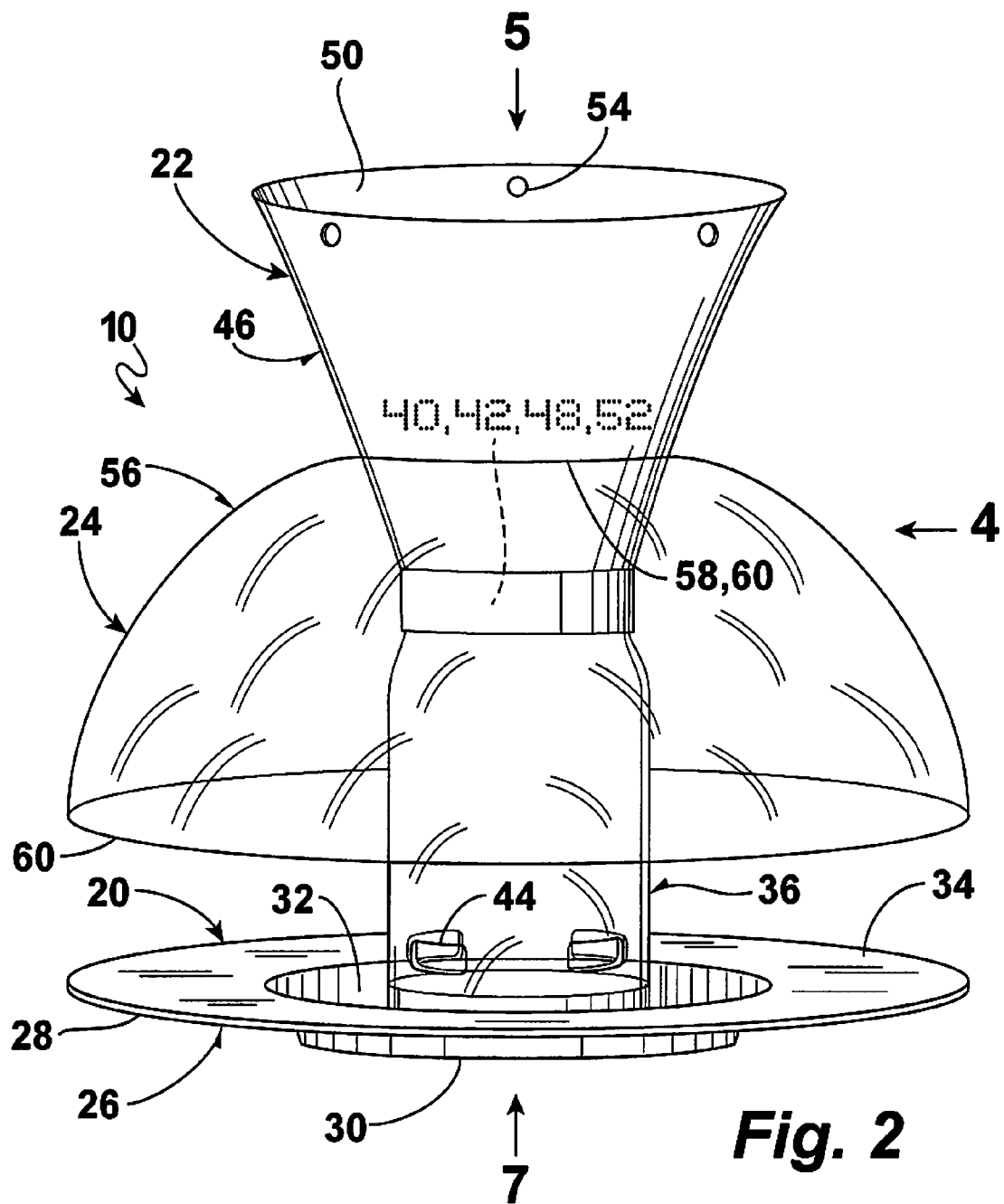
FIG. 2 is a diagrammatic perspective view of the present invention per se.
Figure 3:
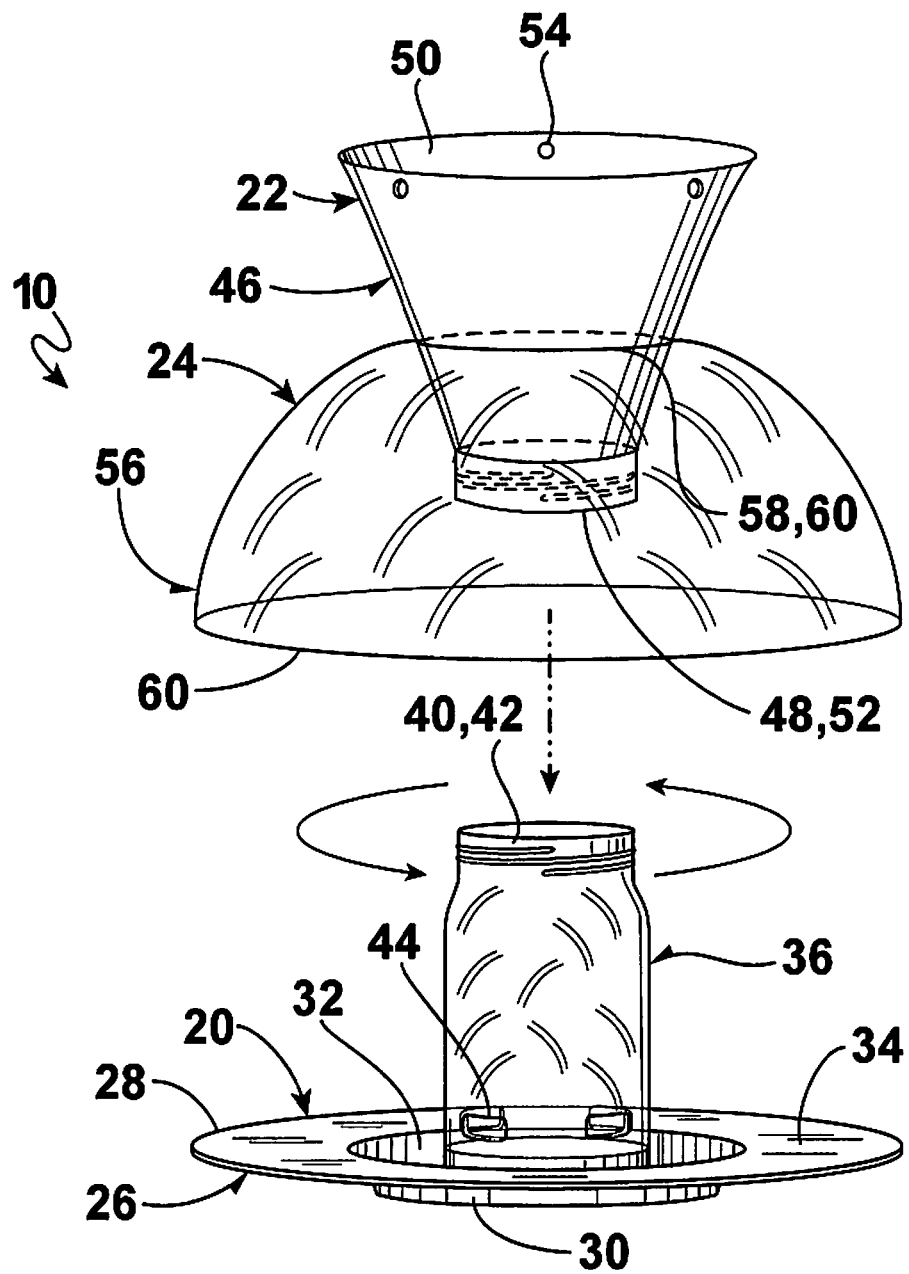
FIG. 3 is a diagrammatic assembly perspective view of the present invention per se, with the two principal parts separated from each other.
Figure 4:
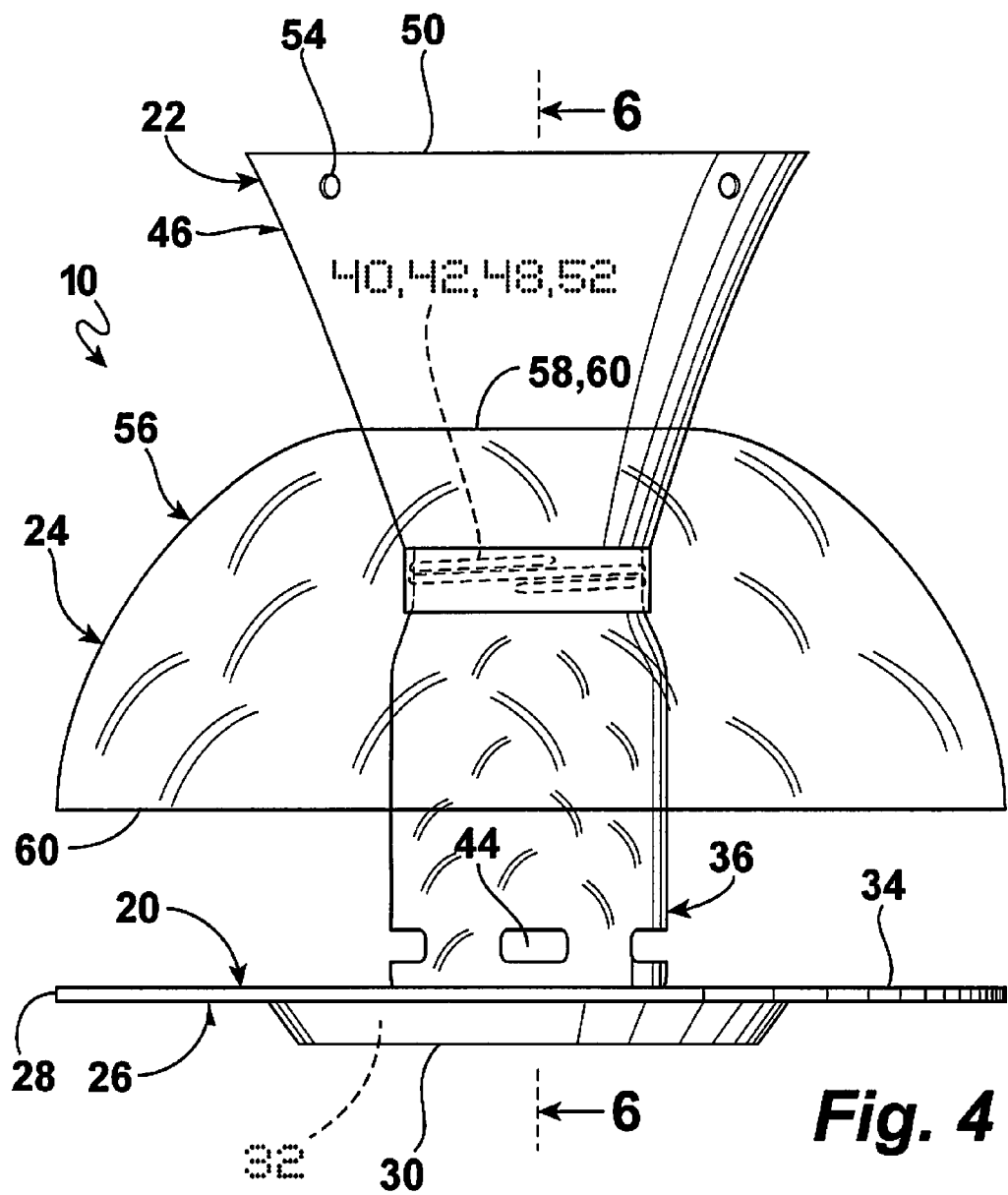
FIG. 4 is a side elevational view thereof, taken in the direction of arrow 4 in FIG. 2.
Figure 5:
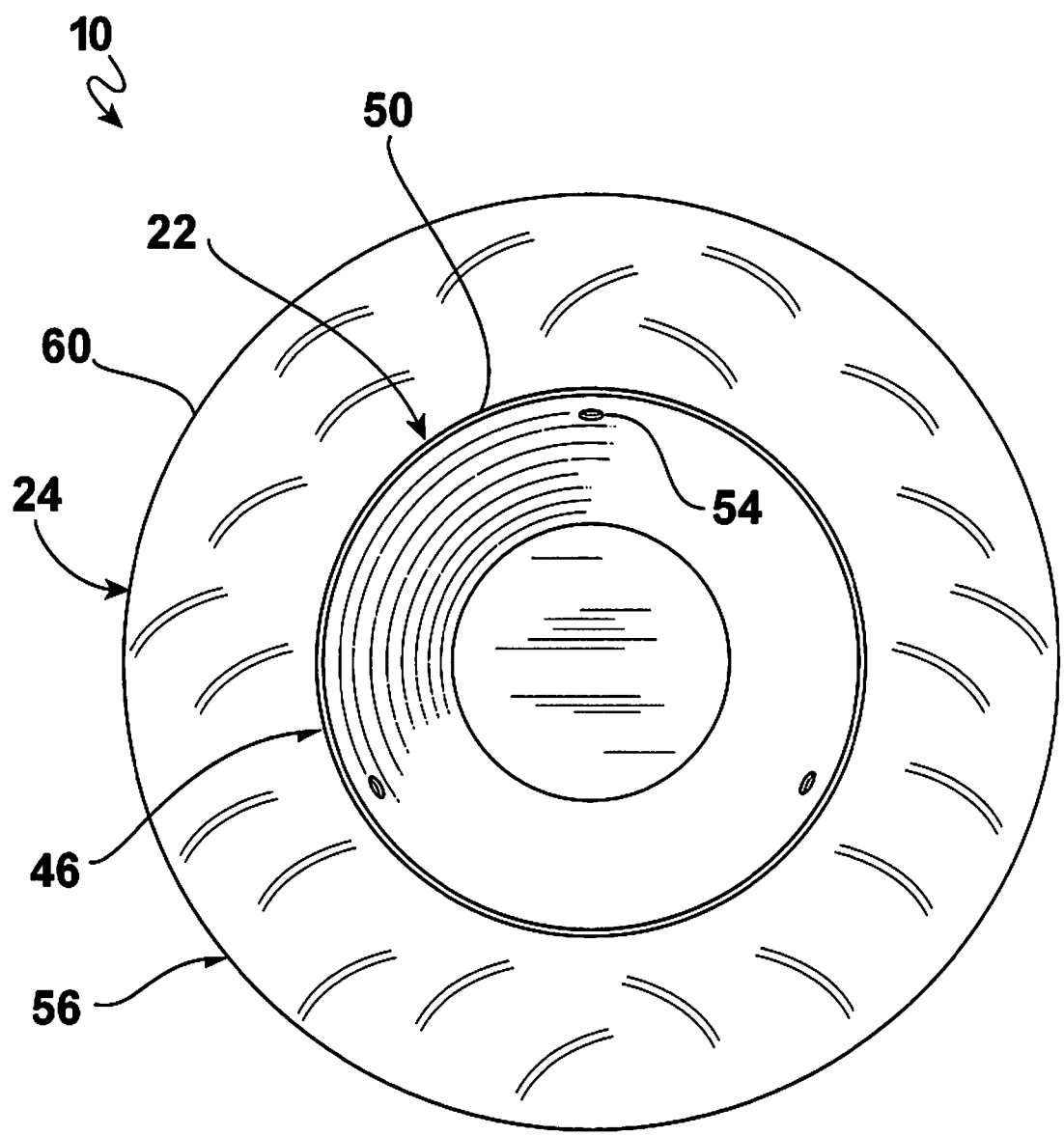
FIG. 5 is a top plan view thereof, taken in the direction of arrow 5 in FIG. 2.
Figure 6:
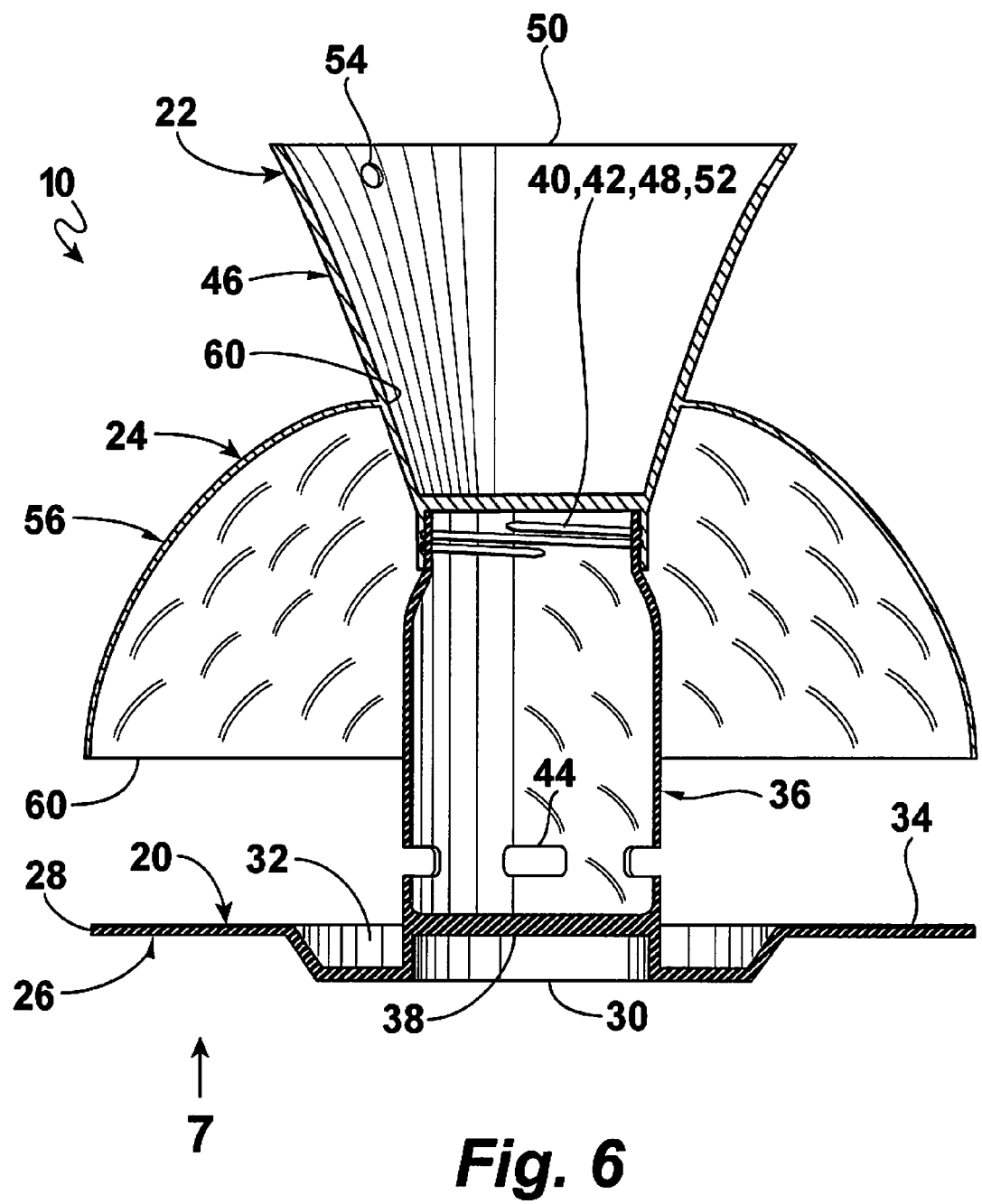
FIG. 6 is a cross sectional view taken on line 6-6 in FIG. 4.
Figure 7:
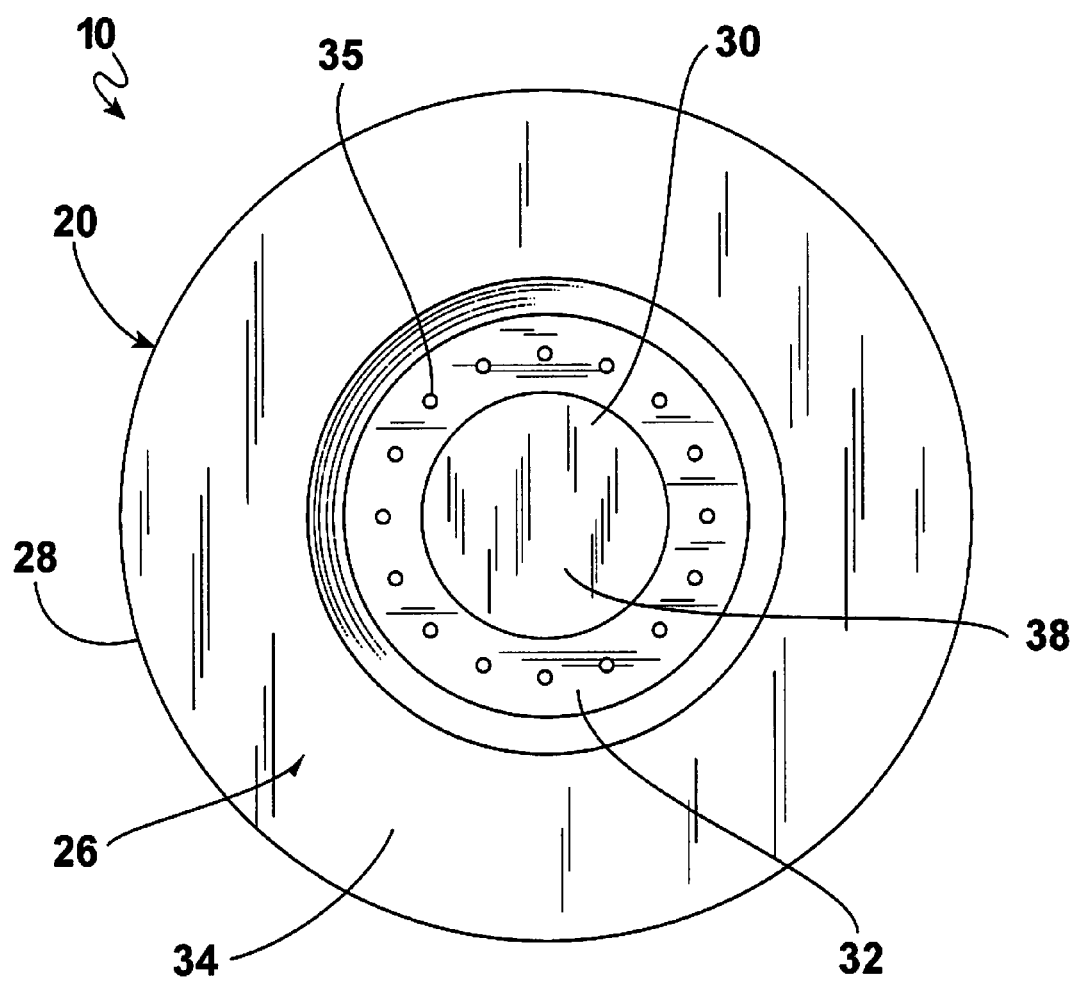
FIG. 7 is a bottom plan view thereof, taken in the direction of arrow 7 in FIGS. 2 and 6.

Introduction 10 hanging assemblage of embodiments of present invention for holding plants 12 and feed 14 for bird 16 and for protecting bird 16 and feed 14 from rodent 18
12 plants
14 feed
16 bird
18 rodent

Overall Configuration of Hanging Assemblage 10

20 feeder assembly for holding feed 14
22 planter assembly for holding plants 12
24 protective assembly for protecting bird 16 and feed 14 from rodent 18

Specific Configuration of Feeder Assembly 20

26 feeder plate of feeder assembly 20
28 perimeter of feeder plate 26 of feeder assembly 20
30 center of feeder plate 26 of feeder assembly 20
32 annular feed trough of feeder plate 26 of feeder assembly 20 for holding feed 14 as bird 16 eats
34 feeding platform of feeder plate 26 of feeder assembly 20 for bird 16 to stand on as bird 16 eats feed 14 in annular feed trough 32 of feeder plate 26 of feeder assembly 20
35 plurality of drain through bores of annular feed trough 32 of feeder plate 26 of feeder assembly 20 for draining unwanted water from annular feed trough 32 of feeder plate 26 of feeder assembly 20
36 feed container of feeder assembly 20 for holding feed 14 prior to feed 14 being automatically gravity fed into annular feed trough 32 of feeder plate 26 of feeder assembly 20
38 closed bottom of feed container 36 of feeder assembly 20
40 open top of feed container 36 of feeder assembly 20
42 male threads bounding open top 40 of feed container 36 of feeder assembly 20
44 plurality of dispensing through bores of feed container 36 of feeder assembly 20 for allowing feed 14 in feed container 36 of feeder assembly 20 to pass through plurality of dispensing through bores 44 of feed container 36 of feeder assembly 20 automatically by gravity and into annular feed trough 32 of feeder plate 26 of feeder assembly 20 when annular feed trough 32 of feeder plate 26 of feeder assembly 20 requires additional feed 14

Specific Configuration of Planter Assembly 22

46 vase of planter assembly 22 for holding plants 12
48 open bottom of vase 46 of planter assembly 22
50 open top of vase 46 of planter assembly 22
52 female threads around open bottom 48 of vase 46 of planter assembly 22
54 plurality of through bores of open top 50 of vase 46 of planter assembly 22 for allowing hanging assemblage 10 to be hung

Specific Configuration of Protective Assembly 24

56 shield of protective assembly 24 for protecting bird 16 and feed 14 from rodent 18
58 center of shield 56 of protective assembly 24
60 through bore of shield 56 of protective assembly 24
62 perimeter of shield of protective assembly 24

DETAILED DESCRIPTION OF THE PREFERRED EMBODIMENT

The Introduction

Referring now to the figures, in which like numerals indicate like parts, and particularly to FIG. 1, the hanging assemblage of the embodiments of the present invention is shown generally at 10 for holding plants 12 and feed 14 for a bird 16 and for protecting the bird 16 and the feed 14 from a rodent 18.

The Overall Configuration of the Hanging Assemblage 10

The configuration of the hanging assemblage 10 can best be seen in FIGS. 2-7, and as such, will be discussed with reference thereto.

The hanging assemblage 10 comprises a feeder assembly 20, a planter assembly 22, and a protective assembly 24. The feeder assembly 20 is for holding the feed 14 for the bird 16. The planter assembly 22 extends replaceably upwardly from the feeder assembly 20, and is for holding the plants 12. The protective assembly 24 is affixed around the planter assembly 22, is spaced over the feeder assembly 20, and is for protecting the bird 16 and the feed 14 from the rodent 18.

The Specific Configuration of the Feeder Assembly 20

The feeder assembly 20 comprises a feeder plate 26.

The feeder plate 26 of the feeder assembly 20 is dish-shaped, and has a perimeter 28 and a center 30.

The feeder plate 26 of the feeder assembly 20 further has an annular feed trough 32. The annular feed trough 32 of the feeder plate 26 of the feeder assembly 20 is for holding the feed 14 for the bird 16 as the bird 16 eats the feed 14.

The annular feed trough 32 of the feeder plate 26 of the feeder assembly 20 is disposed at the center 30 of the feeder plate 26 of the feeder assembly 20, and is concentric with the perimeter 28 of the feeder plate 26 of the feeder assembly 20 so as to form a feeding platform 34 therebetween. The feeding platform 34 of the feeder plate 26 of the feeder assembly 20 is for the bird 16 to stand on as the bird 16 eats the feed 14 in the annular feed trough 32 of the feeder plate 26 of the feeder assembly 20.

The annular feed trough 32 of the feeder plate 26 of the feeder assembly 20 has a plurality of drain through bores 35. The plurality of drain through bores 35 of the annular feed trough 32 of the feeder plate 26 of the feeder assembly 20 are for draining unwanted water from the annular feed trough 32 of the feeder plate 26 of the feeder assembly 20. It is to be understood that the plurality of drain through bores 35 of the annular feed trough 32 of the feeder plate 26 of the feeder assembly 20 are of a size that is smaller than the feed 14, to thereby prevent the feed 14 from dropping therethrough.

The feeder assembly 20 further comprises a feed container 36. The feed container 36 of the feeder assembly 20 is for holding the feed 14 prior to the feed 14 being automatically gravity fed into the annular feed trough 32 of the feeder plate 26 of the feeder assembly 20.

The feed container 36 of the feeder assembly 20 has a closed bottom 38 and an open top 40.

The closed bottom 38 of the feed container 36 of the feeder assembly 20 is disposed on the center 30 of the feeder plate 26 of the feeder assembly 20, with the feed container 36 of the feeder assembly 20 extending upwardly therefrom.

The open top 40 of the feed container 36 of the feeder assembly 20 is bounded by male threads 42.

The feed container 36 of the feeder assembly 20 further has a plurality of dispensing through bores 44.

The plurality of dispensing through bores 44 of the feed container 36 of the feeder assembly 20 are spaced therearound, and disposed just above the annular feed trough 32 of the feeder plate 26 of the feeder assembly 20, so as to communicate therewith, and for allowing the feed 14 in the feed container 36 of the feeder assembly 20 to pass through the plurality of dispensing through bores 44 of the feed container 36 of the feeder assembly 20 automatically by gravity into the annular feed trough 32 of the feeder plate 26 of the feeder assembly 20 when the annular feed trough 32 of the feeder plate 26 of the feeder assembly 20 requires additional feed 14 (See FIG. 1).

The Specific Configuration of the Planter Assembly 22

The planter assembly 22 comprises a vase 46. The vase 46 of the planter assembly 22 is for holding the plants 12.

The vase 46 of the planter assembly 22 has an open bottom 48 and an open top 50.

The vase 46 of the planter assembly 22 is vertically oriented, and flares upwardly, outwardly, and coaxially from the open bottom 48 of the vase 46 of the planter assembly 22 to the open top 50 of the vase 46 of the planter assembly 22 so as to form substantially a frustum of a cone.

The open bottom 48 of the vase 46 of the planter assembly 22 has female threads 52 therearound.

The female threads 52 around the open bottom 48 of the vase 46 of the planter assembly 22 threadably receive the male threads 42 of the open top 40 of the feed container 36 of the feeder assembly 20, and in doing so, the vase 46 of the planter assembly 22 extends coaxially upwardly and replaceably from the feed container 36 of the feeder assembly 20.

The open top 50 of the vase 46 of the planter assembly 22 has a plurality of through bores 54 spaced therearound. The plurality of through bores 54 of the open top 50 of the vase 46 of the planter assembly 22 are for allowing the hanging assemblage 10 to be hung.

The Specific Configuration of the Protective Assembly 24

The protective assembly 24 comprises a shield 56.

The shield 56 of the protective assembly 24 is hemispherical-shaped, has a center 58 and a through bore 60, and is for protecting the bird 16 and the feed 14 from the rodent 18.

The through bore 60 of the shield 56 of the protective assembly 24 is disposed at the center 58 of the shield 56 of the protective assembly 24.

The shield 56 of the protective assembly 24 is affixed around the vase 46 of the planter assembly 22 forming a canopy that is over the feeder plate 26 of the feeder assembly 20 totally, by the vase 46 of the planter assembly 22 being received by the through bore 60 of the shield 56 of the protective assembly 24, and with the shield 56 of the protective assembly 24 opening downwardly therefrom to a perimeter 62.

The perimeter 62 of the shield 56 of the protective assembly 24 is in vertical alignment with the perimeter 28 of the feeder plate 26 of the feeder assembly 20, and is spaced above the perimeter 28 of the feeder plate 26 of the feeder assembly 20 a distance for allowing access for the bird 16 to eat the feed 14 while preventing the rodent 18 from passing therebetween and attacking the bird 16 and the feed 14.

The shield 56 of the protective assembly 24 extends 360° around for further preventing the rodent 18 from attacking the bird 16 and the feed 14.

The shield 56 of the protective assembly 24 is smooth for causing the rodent 18 to slip on the shield 56 of the protective assembly 24 and not be able to grab the shield 56 of the protective assembly 24 for still further preventing the rodent 18 from attacking the bird 16 and the feed 14.

The shield 56 of the protective assembly 24 is transparent for allowing a viewer to view the bird 16 while feeding.

The Impressions

It will be understood that each of the elements described above, or two or more together, may also find a useful application in other types of constructions differing from the types described above.

While the invention has been illustrated and described as embodiments of a planter bird feeder combination with 360 degree feed protective shield, accordingly it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A hanging assemblage for holding plants and feed for a bird and for protecting the bird and the feed from a rodent, comprising:
   a) a feeder assembly;
   b) a planter assembly; and
   c) a protective assembly;
   wherein said feeder assembly holds the feed for the bird;
   wherein said planter assembly extends replaceably upwardly from said feeder assembly;
   wherein said planter assembly holds the plants;
   wherein said protective assembly is affixed around said planter assembly;
   wherein said protective assembly is spaced over said feeder assembly; and
   wherein said protective assembly protects the bird and the feed from the rodent;
   wherein a vase of said planter assembly flares upwardly;
   wherein said vase of said planter assembly is substantial a frustum of a cone;
   wherein said open top of said vase of said planter assembly has a plurality of through bores spaced therearound;
   wherein said plurality of through bores of said open top of said vase of said planter assembly are for allowing said hanging assemblage to be hung;
   wherein said protective assembly comprises a shield;
   wherein said shield of said protective assembly is affixed around said vase of said planter assembly;

wherein said shield of said protective assembly is transparent for allowing a viewer to view the bird while feeding;

wherein said shield of said protective assembly protects the bird and the feed from the rodent;

wherein said shield of said protective assembly is a canopy that extends 360° around for preventing the rodent from attacking the bird and the feed;

wherein said shield of said protective assembly is smooth for causing the rodent to slip on said shield of said protective assembly and not be able to grab said shield of said protective assembly for preventing the rodent from attacking the bird and the feed; and wherein said shield of said protective assembly is hemispherical shaped.

2. The hanging assemblage of claim 1, wherein said feeder assembly has a feeder plate.

3. The hanging assemblage of claim 2, wherein said feeder plate of said feeder assembly is dish-shaped.

4. The hanging assemblage of claim 2, wherein said feeder plate of said feeder assembly has a perimeter.

5. The hanging assemblage of claim 4, wherein said feeder plate of said feeder assembly has a center.

6. The hanging assemblage of claim 5, wherein said feeder plate of said feeder assembly has an annular feed trough; and wherein said annular feed trough of said feeder plate of said feeder assembly is for holding the feed for the bird as the bird eats the feed.

7. The hanging assemblage of claim 6, wherein said annular feed trough of said feeder plate of said feeder assembly is disposed at said center of said feeder plate of said feeder assembly.

8. The hanging assemblage of claim 6, wherein said annular feed trough of said feeder plate of said feeder assembly is concentric with said perimeter of said feeder plate of said feeder assembly so as to form a feeding platform therebetween; and wherein said feeding platform of said feeder plate of said feeder assembly is for the bird to stand on as the bird eats the feed in said annular feed trough of said feeder plate of said feeder assembly.

9. The hanging assemblage of claim 6, wherein said annular feed trough of said feeder plate of said feeder assembly has a plurality of drain through bores; and wherein said plurality of drain through bores of said annular feed trough of said feeder plate of said feeder assembly are for draining unwanted water from said annular feed trough of said feeder plate of said feeder assembly.

10. The hanging assemblage of claim 6, wherein said feeder assembly comprises a feed container; and wherein said feed container of said feeder assembly is for holding the feed prior to the feed being automatically gravity fed into said annular feed trough of said feeder plate of said feeder assembly.

11. The hanging assemblage of claim 10, wherein said feed container of said feeder assembly has a closed bottom.

12. The hanging assemblage of claim 10, wherein said feed container of said feeder assembly has an open top.

13. The hanging assemblage of claim 11, wherein said closed bottom of said feed container of said feeder assembly is disposed on said center of said feeder plate of said feeder assembly.

14. The hanging assemblage of claim 10, wherein said feed container of said feeder assembly extends upwardly from said center of said feeder plate of said feeder assembly.

15. The hanging assemblage of claim 12, wherein said open top of said feed container of said feeder assembly is bounded by male threads.

16. The hanging assemblage of claim 10, wherein said feed container of said feeder assembly has a plurality of dispensing through bores.

17. The hanging assemblage of claim 16, wherein said plurality of dispensing through bores of said feed container of said feeder assembly are spaced therearound.

18. The hanging assemblage of claim 17, wherein said plurality of dispensing through bores of said feed container of said feeder assembly are disposed just above said annular feed trough of said feeder plate of said feeder assembly.

19. The hanging assemblage of claim 17, wherein said plurality of dispensing through bores of said feed container of said feeder assembly communicate with said annular feed trough of said feeder plate of said feeder assembly for allowing the feed in said feed container of said feeder assembly to pass through said plurality of dispensing through bores of said feed container of said feeder assembly automatically by gravity into said annular feed trough of said feeder plate of said feeder assembly when said annular feed trough of said feeder plate of said feeder assembly requires additional feed.

20. The hanging assemblage of claim 15, wherein said planter assembly comprises a vase; and wherein said vase of said planter assembly is for holding the plants.

21. The hanging assemblage of claim 20, wherein said vase of said planter assembly has an open bottom.

22. The hanging assemblage of claim 21, wherein said vase of said planter assembly has an open top.

23. The hanging assemblage of claim 20, wherein said vase of said planter assembly is vertically oriented.

24. The hanging assemblage of claim 22, wherein said vase of said planter assembly extends coaxially from said open bottom of said vase of said planter assembly to said open top of said vase of said planter assembly.

25. The hanging assemblage of claim 21, wherein said open bottom of said vase of said planter assembly has female threads therearound.

26. The hanging assemblage of claim 25, wherein said female threads around said open bottom of said vase of said planter assembly threadably receive said male threads of said open top of said feed container of said feeder assembly.

27. The hanging assemblage of claim 20, wherein said vase of said planter assembly extends coaxially from said feed container of said feeder assembly.

28. The hanging assemblage of claim 20, wherein said vase of said planter assembly extends upwardly from said feed container of said feeder assembly.

29. The hanging assemblage of claim 20, wherein said vase of said planter assembly extends replaceably from said feed container of said feeder assembly.

30. The hanging assemblage of claim 1, wherein said shield of said protective assembly has a center.

31. The hanging assemblage of claim 30, wherein said shield of said protective assembly has a through bore.

32. The hanging assemblage of claim 31, wherein said through bore of said shield of said protective assembly is disposed at said center of said shield of said protective assembly.

33. The hanging assemblage of claim 31, wherein said vase of said planter assembly is received by said through bore of said shield of said protective assembly.

34. The hanging assemblage of claim 1, wherein said shield of said protective assembly opens downwardly to a perimeter.

35. The hanging assemblage of claim 34, wherein said perimeter of said shield of said protective assembly is in vertical alignment with said perimeter of said feeder plate of said feeder assembly.

36. The hanging assemblage of claim 34, wherein said perimeter of said shield of said protective assembly is spaced above said perimeter of said feeder plate of said feeder assembly a distance for allowing access for the bird while preventing the rodent from passing therebetween and attacking the bird and the feed.

* * * * *